United States Patent Office.

P. S. DEVLAN, OF JERSEY CITY, NEW JERSEY.

Letters Patent No. 63,618, dated April 9, 1867; antedated March 24, 1867.

IMPROVEMENT IN COATING WOOD.

*The Schedule referred to in these Letters Patent and making part of the same.*

TO ALL WHOM IT MAY CONCERN:

Be it known that I, P. S. DEVLAN, of Jersey City, in the State of New Jersey, have invented a new and useful Improvement in Coating Wood to render it proof against fire and impervious to liquids, of which the following is a full, clear, and exact description.

I have discovered that vegetable fibres properly reduced, such as pulp for making paper, when mixed with the silicate of soda, and applied while in the plastic state to the surface of wood, will adhere thereto, so as to require considerable force to remove it, and that surfaces so coated will be thereby rendered not only fire-proof, but impervious to the most searching liquids.

I take silicate of soda in the liquid state, and pulp obtained from any of the vegetable fibrous substances, prepared as for the making of paper, and mix them in about equal proportions by weight; and, after they have been thoroughly mixed, and while the compound is in the plastic state, I apply it with a trowel, or other suitable instrument, to the surface of wood to any suitable thickness, and there suffer it to dry. After drying it will be found to adhere firmly to the surface of the wood, which is thereby rendered impervious to liquids and fire-proof.

For covering the roofs of houses I prefer to put on the composition to a thickness of from a quarter to half an inch. The roof should be first covered with boards, which may be either planed or as they come from the saw-mill, and the composition applied to the outer surface; but, if desired, it can be applied to the inner surface also. In like manner the surfaces of frame houses may be covered with the said composition, and thereby rendered fire and water-proof; and, as the composition is proof against the passage of water and air, houses so coated will be far superior to frame houses as heretofore constructed, and far more durable, as the composition will effectually preserve the wood from mould or decay.

By the admixture of coloring matter in the preparation of the composition any desired plain or variegated color can be given to the surface; or, the desired color can be given to the surface after it is dry by painting with a brush. The surface of this compound is susceptible of the highest polish, like the finest marble. The same composition, when applied in like manner to the outer surface of ships, will effectually prevent leaks, and all the evil effects of water on the material of which ships are constructed, add to their strength, and, if made smooth, will enable them to glide through the water with less friction than if copper-lined. The same composition, when applied to the surface of casks and other vessels, will render such casks or vessels proof against the most searching liquids, such as petroleum, spirits of turpentine, and the like; and if such vessels be lined on the outside with the said composition they will be thereby rendered fire-proof, and for that reason well adapted to the keeping and transportation of petroleum, and other inflammable liquids and explosive substances. Other substances, such as plumbago, pulverized soap-stone, gums, such as India rubber, gutta percha, and others, may be mixed with the silicate and fibre.

What I claim as my invention, and desire to secure by Letters Patent, is—

The coating of wood with the compound of silicate and vegetable fibre, substantially as and for the purpose specified.

P. S. DEVLAN.

Witnesses:
WM. H. BISHOP,
A. DE LACY.